B. W. RICHARDS.
CUT-OFF FOR GASOLENE FEED ON MOTOR VEHICLES.
APPLICATION FILED MAR. 18, 1920.
1,392,449.
Patented Oct. 4, 1921.
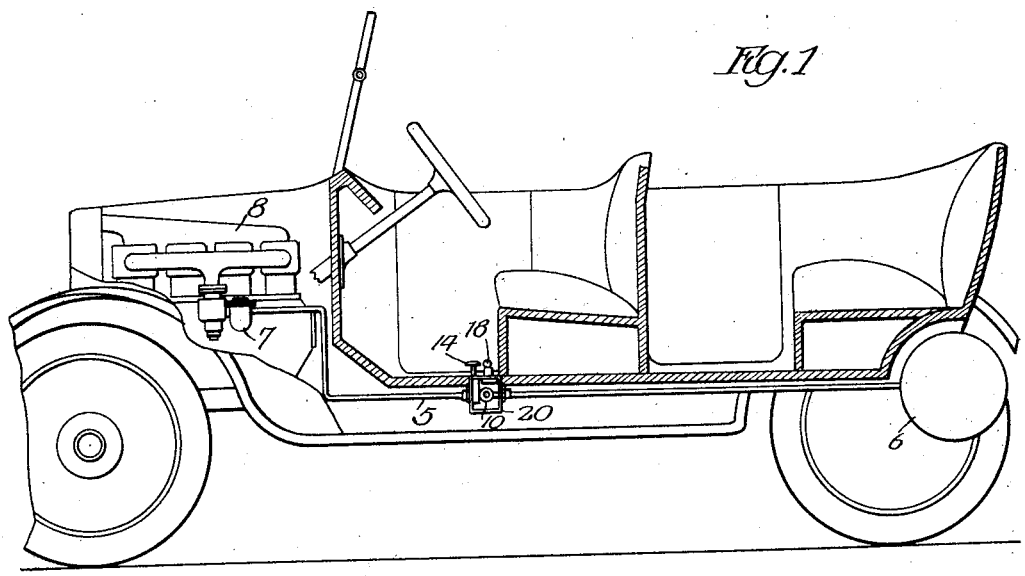
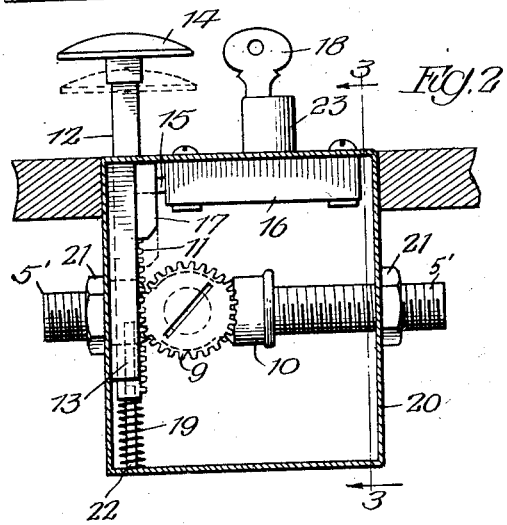
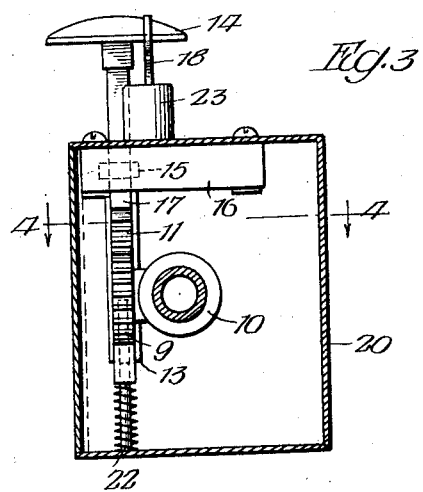
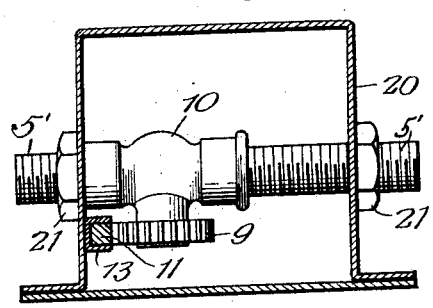
Inventor
Bernard W. Richards.
By Wm. C. Belt, Atty.

UNITED STATES PATENT OFFICE.

BERNARD W. RICHARDS, OF CHICAGO, ILLINOIS.

CUT-OFF FOR GASOLENE-FEED ON MOTOR-VEHICLES.

1,392,449. Specification of Letters Patent. Patented Oct. 4, 1921.

Application filed March 18, 1920. Serial No. 366,773.

*To all whom it may concern:*

Be it known that I, BERNARD W. RICHARDS, a citizen of the United States, residing at Chicago, in the county of Cook and State of Illinois, have invented certain new and useful Improvements in Cut-Offs for Gasolene-Feed on Motor-Vehicles, of which the following is a specification.

The object of this invention is to provide an easily operated device of simple construction for shutting off the fuel feed to an internal combustion engine and thereby, in effect, lock the engine so that it cannot be used.

My invention is intended primarily for use on automobiles, trucks and the like to prevent them from being stolen, and it can be easily installed in the feed line between the supply and the engine on cars now in use as well as on new cars being built.

In the accompanying drawings illustrating a selected embodiment of the invention, Figure 1 is a sectional elevation of an automobile having my invention installed in the feed pipe between the rear tank and the engine;

Fig. 2 is an enlarged elevation of the device, partly in section;

Fig. 3 is a vertical sectional view on the line 3—3 of Fig. 2;

Fig. 4 is a horizontal sectional view on the line 4—4 of Fig. 3.

In the drawings 5 is the feed pipe running from a rear tank 6 or other source of supply to the carbureter 7 of the engine 8. A gear 9 is rigidly mounted on the stem of valve 10 of any suitable kind which is interposed in the pipe 5, and this gear meshes with a rack 11 on the push bar 12 which slides in a suitable channel guide 13 and is provided with a head 14. The bolt 15 of a lock 16 is arranged to engage a lug 17 on the bar 12. The lock may be any one of many different kinds suitable for the purpose in which the bolt is normally under spring pressure to project it forwardly and is retracted by means of a key 18. A spring 19 operates against the end of the push bar to hold it normally in outward position with the valve open. When the push bar is thrust inward to close the valve and shut off the fuel feed the lug 17 is carried beyond bolt 15, which is thereupon projected forward and engages with the lug to hold the push bar and valve in locked position until the bolt is again released by means of the key.

In the drawings I have shown the several parts of my invention inclosed within a casing 20, which may be conveniently secured in the floor-board at the driver's seat and with the fuel feed pipe 5 passing therethrough. The device may be made complete for installation in vehicles now in use by simply cutting the fuel feed pipe and connecting its ends to the ends 5' of the pipe section including the valve which is rigidly secured by nuts 21 in the casing. The guide 13 is mounted on one side of the casing and the push bar may be bored at its lower end to receive a guide rod 22 which is rigidly mounted on the casing and holds the spring 19 in place. The lock is secured within the casing and the key barrel 23 and the push bar head 14 preferably project above the casing a sufficient distance to extend through the floorboard when the casing is fastened to the under side of the floorboard. Thus the invention can be installed in an inconspicuous manner in the machine and in any position convenient for operation by the driver.

I believe it will be found more convenient to locate the device in the floorboard adjacent to the driver's seat, where it can be operated by pressure of the foot, but it is perfectly apparent that it may be arranged in other positions and that it may be located at any place about the vehicle where it can be operated by foot pressure or manually, as may be desired. The push bar head and the key barrel may be made smaller in size and located where they will not be especially noticeable, or the entire device may be arranged under the body, adjacent to the supply tank or under the hood, in any place in the fuel feed pipe where it will not be easily found by anyone unacquainted with its location. I will use a special lock for each device so that the device may only be unlocked by the particular key furnished with it.

It will be readily understood that the spring 19 normally holds the push bar in outward position and the valve open. When it is desired to lock the engine and the vehicle, the push bar is forced inward against the spring and the rack bar shuts the valve, thereby cutting off the fuel supply to the engine. In some cases there may be sufficient fuel between this device and the engine to start the engine but not enough to run the vehicle any great distance and for all practical purposes a lock operating in this way is as effective as if the engine could not be started. The key is, of course, removable from the barrel and when it is operated the bolt 15 is withdrawn from locking engagement with the push bar and the spring 19 forces the push bar to its outward position and opens the valve.

My invention is simple in construction, it can be manufactured and installed at a very reasonable cost, is easily operated and it affords an effective lock for the engine and the vehicle to prevent the vehicle from being stolen. I am aware that changes in the form and construction of parts and details of construction may be made without departing from the invention or sacrificing the advantages thereof, and I reserve the right to make all such changes and modifications as fairly possible within the scope of the following claim.

I claim:

The combination of a casing adapted to be secured to an automobile, a fuel feed pipe for the automobile engine passing through said casing, a push bar within said casing projecting through the casing wall and having a bore in one end, a guide rod on the casing extending into said bore, a spring on said rod between the casing wall and said push bar, a valve in said pipe operatively engaged by said push bar, a lug on said push bar adapted to engage the wall of the casing to limit outward movement of said push bar, and means to engage the lug to lock the push bar in inward position.

BERNARD W. RICHARDS.